Patented May 16, 1933

1,909,684

UNITED STATES PATENT OFFICE

FILIP KAČER, OF MANNHEIM, FRITZ BAUMANN, OF LEVERKUSEN, AND ARTUR KRAUSE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE AZOLE SERIES AND PROCESS OF MAKING THEM

No Drawing. Application filed July 28, 1930, Serial No. 471,410, and in Germany August 3, 1929.

The present invention relates to new vat dyestuffs derived from 1.9-thiazole-anthrone-2-carboxylic acid or its derivatives and process of producing same.

We have found that new vat dyestuffs which are azoles corresponding to the general formula:

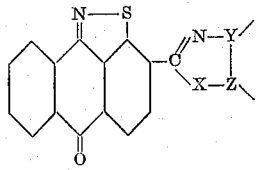

in which X stands for —S—, —O—, or —NH—, and Y and Z for two vicinal carbon atoms of an aromatic radicle, are obtained by condensing 1.9-thiazole-anthrone-2-carboxylic acid or its derivatives with ortho-aminophenols, ortho-aminomercaptans or ortho-diamines. The corresponding ω-dihalogen-methyl compounds or aldehydes may be employed instead of the 1.9-thiazolean-throne-2-carboxylic acids. The 1.9-thiazole-anthrone-2-carboxylic acid may be obtained by the action of sodium sulphide and ammonia on 1-chloranthraquinone-2-carboxylic acid. The corresponding ω-dihalogen-methyl compounds may be prepared by acting on 2-methyl-1.9-thiazole anthrone with halogen, for example by acting on the said thiazole-anthrone with bromine in trichlorobenzene at 160° C.

If desired, other substituents may be introduced into the new vat dyestuffs thus obtained. Thus, the products may be halogenated or nitrated according to known methods. The nitro derivatives thus prepared may be reduced to the corresponding amino compounds in which the hydrogen atoms of the amino group or groups may be wholly or partly replaced by organic radicles by acylation or condensation with negatively substituted organic compounds.

The following examples will further illustrate the nature of this invention, but the invention is not restricted to these examples. The parts are by weight.

Example 1

30 parts of 1.9-thiazole-anthrone-2-carboxylic acid chloride are heated to boiling with 24 parts of 2-amino-3-hydroxyanthraquinone and 500 parts of nitrobenzene. In this manner a yellow condensation product separates very soon, even while hot, and this is filtered off by suction, washed with nitrobenzene and ethyl alcohol and dried. The dry product is dissolved at from 90° to 100° C. in 10 parts of sulphuric acid of 66° Baumé strength, and after allowing the yellow solution to stand for a short time at the same temperature it is stirred into water, the dyestuff which separates out being filtered off and washed until neutral. Clear lemon yellow dyeings of great fastness are obtained on cotton with this dyestuff from a violet hydrosulphite vat.

Example 2

30 parts of 1.9-thiazole-anthrone-2-carboxylic acid chloride are heated to boiling for about one quarter of an hour with 25.5 parts of 1-mercapto-2-aminoanthraquinone and 500 parts of nitrobenzene. The yellow thiazole which separates out is filtered off by suction, washed with nitrobenzene and ethyl alcohol, dried if desired and crystallized from sulphuric acid. It dissolves in sulphuric acid giving a yellow coloration, gives a violet hydrosulphite vat and dyes cotton therefrom powerful yellow shades of great fastness.

Vat dyestuffs giving similar dyeings are obtained by employing 14.3 parts of 1.5-dimercapto-2.6-diaminoanthraquinone or 17 parts of benzidine-di-ortho-thiosulphoxide which is converted into the di-ortho-mercaptobenzidine under the working conditions, instead of the 25.5 parts of 1-mercapto-2-aminoanthraquinone.

Example 3

30 parts of 1.9-thiazole-anthrone-2-carboxylic acid chloride are heated to boiling with 11 parts of orthophenylene-diamine and 500 parts of nitrobenzene until the formation of the dyestuff is completed. The product which separates even while hot is filtered off by suction, washed with nitrobenzene and ethyl alcohol and may then be employed as a vat dyestuff without further treatment. It dissolves in concentrated sulphuric acid giving a yellow solution and gives yellow dyeings on cotton from a red violet hydrosulphite vat.

Similar vat dyestuffs are obtained by employing the corresponding amounts of 1.2- or 2.3-diaminoanthraquinone instead of ortho-phenylenediamine.

What we claim is:—

1. Vat dyestuffs which are azoles corresponding to the general formula:

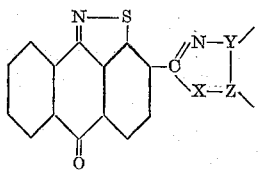

in which X stands for —O—, or —NH—, and Y and Z for two vicinal carbon atoms of a benzene or anthraquinone radicle, and in which the anthraquinone fully shown in the above formula and the benzene or anthraquinone radicle containing the carbon atoms Y and Z may be substituted by a substituent selected from the group consisting of halogen, the nitro group and the amino group.

2. Vat dyestuff corresponding to the formula:

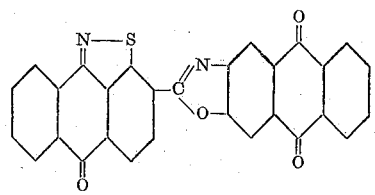

dissolving in concentrated sulphuric acid giving a yellow solution and dyeing cotton lemon yellow shades from a violet vat.

3. Vat dyestuff corresponding to the formula:

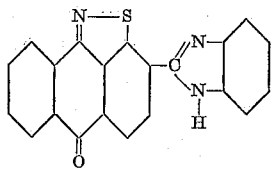

dissolving in concentrated sulphuric acid giving a yellow solution and dyeing cotton yellow shades from a red violet vat.

4. A process of producing vat dyestuffs, which comprises condensing a 1.9-thiazole-anthrone substituted in the 2-position by a radicle selected from the group consisting of the carboxylic acid radicle and its halides, the dihalogen methyl and the aldehyde radicle, with an aromatic amine selected from the benzene or anthraquinone series, which is substituted in ortho-position to the amino group by one of the radicles —OH and —NH$_2$.

5. A process of producing vat dyestuffs, which comprises condensing 1.9-thiazole-anthrone-2-carboxylic acid chloride with an aromatic amine selected from the benzene or anthraquinone series, which is substituted in ortho-position to the amino group by one of the radicles —OH and —NH$_2$.

In testimony whereof we have hereunto set our hands.

FILIP KAČER.
FRITZ BAUMANN.
ARTUR KRAUSE.